(12) United States Patent
Nyander et al.

(10) Patent No.: US 7,629,392 B2
(45) Date of Patent: Dec. 8, 2009

(54) SILICA-BASED SOLS AND THEIR PRODUCTION AND USE

(75) Inventors: Johan Nyander, Sollentuna (SE); Glenn Mankin, Martinez, GA (US)

(73) Assignee: Akzo Nobel N.V., Arnhem (NL)

( * ) Notice: Subject to any disclaimer, the term of this patent is extended or adjusted under 35 U.S.C. 154(b) by 403 days.

(21) Appl. No.: 11/100,683

(22) Filed: Apr. 7, 2005

(65) Prior Publication Data

US 2005/0228057 A1    Oct. 13, 2005

Related U.S. Application Data

(60) Provisional application No. 60/559,958, filed on Apr. 7, 2004, provisional application No. 60/559,965, filed on Apr. 7, 2004.

(51) Int. Cl.
C01B 33/143   (2006.01)
C01B 33/141   (2006.01)

(52) U.S. Cl. .............................. 516/83; 516/79; 516/80; 516/928

(58) Field of Classification Search .................. 516/83, 516/80, 79, 928
See application file for complete search history.

(56) References Cited

U.S. PATENT DOCUMENTS

| | | | |
|---|---|---|---|
| 2,577,485 A | 12/1951 | Rule | 252/313 |
| 2,601,352 A | 6/1952 | Wolter | 252/313 |
| 2,630,410 A | 3/1953 | Clapsadle et al. | 252/313 |
| 2,727,008 A | 12/1955 | Iler | 252/313 |
| 2,750,345 A | 6/1956 | Alexander | 252/313 |
| 2,754,270 A | 7/1956 | Kimberlin et al. | 252/313 |
| 2,892,797 A | 6/1959 | Alexander et al. | 252/313 |
| 2,974,108 A | 3/1961 | Alexander | 252/313 |
| 3,083,167 A | 3/1963 | Shannon | 252/313 |
| 3,374,180 A | 3/1968 | Marotta | 252/313 |
| 3,533,816 A | 10/1970 | Oken | 106/74 |
| 3,655,578 A | 4/1972 | Yates | 252/313 S |
| 3,857,925 A | 12/1974 | Sirianni et al. | 423/339 |
| 3,916,058 A | 10/1975 | Vossos | 428/241 |
| 3,956,171 A | 5/1976 | Moore, Jr. et al. | 252/313 S |
| 4,272,409 A | 6/1981 | Bergna | 252/455 R |
| 4,388,150 A | 6/1983 | Sunden et al. | 162/175 |
| 4,750,974 A | 6/1988 | Johnson | 162/164.1 |
| 4,927,498 A | 5/1990 | Rushmere | 162/168.3 |
| 4,954,220 A | 9/1990 | Rushmere | 162/168.3 |
| 5,100,581 A | 3/1992 | Watanabe et al. | 252/313.2 |
| 5,127,994 A | 7/1992 | Johansson | 162/168.3 |
| 5,176,891 A | 1/1993 | Rushmere | 423/328.1 |
| 5,230,833 A | 7/1993 | Romberger et al. | 252/363.5 |
| 5,240,561 A | 8/1993 | Kaliski | 162/138 |
| 5,279,807 A | 1/1994 | Moffett et al. | 423/338 |
| 5,368,833 A | 11/1994 | Johansson et al. | 423/328 |
| 5,447,604 A | 9/1995 | Johansson et al. | 162/181.6 |
| 5,470,435 A | 11/1995 | Rushmere et al. | 162/181.6 |
| 5,482,693 A | 1/1996 | Rushmere et al. | 423/328.1 |
| 5,503,820 A | 4/1996 | Moffett et al. | 423/333 |
| 5,543,014 A | 8/1996 | Rushmere et al. | 162/181.6 |
| 5,571,494 A | 11/1996 | Saastamoinen | 423/338 |
| 5,603,805 A | 2/1997 | Andersson et al. | 162/168.3 |
| 5,626,721 A | 5/1997 | Rushmere et al. | 162/181.6 |
| 5,707,494 A | 1/1998 | Rushmere et al. | 162/181.6 |
| 5,708,069 A | 1/1998 | Burns et al. | |
| 5,846,384 A | 12/1998 | Schöld et al. | 162/175 |
| 5,964,693 A | 10/1999 | Brekau et al. | 516/82 |
| 6,083,997 A | 7/2000 | Begala et al. | 516/79 |
| 6,228,217 B1 | 5/2001 | Dickerson et al. | |
| 6,372,089 B1 | 4/2002 | Keiser et al. | 162/181.6 |
| 6,372,806 B1 | 4/2002 | Keiser et al. | 516/82 |
| 6,379,500 B2 | 4/2002 | Greenwood et al. | 162/181.6 |
| 2002/0139502 A1 | 10/2002 | Hallstrom et al. | 162/168.3 |
| 2003/0024671 A1* | 2/2003 | Persson et al. | 162/181.6 |

FOREIGN PATENT DOCUMENTS

| | | |
|---|---|---|
| SU | 549541 | 3/1977 |
| SU | 1446106 A1 | 12/1988 |

(Continued)

OTHER PUBLICATIONS

R. K. Iler and R. L. Dalton, "Degree of Hydration of Particles of Colloidal Silica in Aqueous Solution," Grasselli Chemicals Department and E. I. Du Pont de Nemours and Co. Inc., Jan. 16, 1956, vol. 60, pp. 955-957.

(Continued)

Primary Examiner—Timothy J. Kugel
(74) Attorney, Agent, or Firm—Kenyon & Kenyon LLP

(57) ABSTRACT

A process for producing an aqueous silica-based soils disclosed wherein a cationic ion exchange resin having part of its ion exchange capacity in hydrogen form is contacted with an aqueous alkali metal silicate to form a slurry having a pH from 5.0 to 11.5 and/or having particle aggregation or microgel formation corresponding to a S value up to 45%; adjusting the pH using a material comprising an aluminum compound; and separating the resin from the slurry.

Silica-based sols having an S value from 15 to 25%, mole ratio Si:Al from 20:1 to 50:1, mole ratio Si:X, where X=alkali metal, from 5:1 to 17:1, $SiO_2$ content of at least 5% by weight and containing silica-based particles having a specific surface area of at least 300 $m^2/g$, as well as the use of such silica-based sols in producing paper are also disclosed.

36 Claims, No Drawings

FOREIGN PATENT DOCUMENTS

| WO | WO 86/00100 | 1/1986 |
|---|---|---|
| WO | WO 86/05826 | 10/1986 |
| WO | WO 89/08741 | 9/1989 |
| WO | WO 93/24409 | 12/1993 |
| WO | WO 94/05597 | 3/1994 |
| WO | WO 95/23021 | 8/1995 |
| WO | WO 98/56715 | 12/1998 |
| WO | WO 98/56716 | 12/1998 |
| WO | WO 00/66491 | 11/2000 |
| WO | WO 00/66492 | 11/2000 |

OTHER PUBLICATIONS

George W. Sears Jr., "Determination of Specific Surface Area of Colloidal Silica by Titration with Sodium Hydroxide," Grasselli Chemicals Department and E. I. Du Pont de Nemours & Co., Inc., Dec. 12, 1956, vol. 28, pp. 1981-1983.

European Search Report EP 04 44 5048 dated Aug. 26, 2004.

Derwent abstract No. 008026336 abstracting SU 1446106 A1.

English language translation of SU 1446106 A1 (6 pages).

Moffett, Robert H., "On-site production of a silica-based microparticulate retention and drainage aid," Tappi Journal, vol. 77, No. 12, pp. 133-138.

International Search Report No. PCT/SE2005/000488 dated Sep. 21, 2005.

V. Rieman, et al., "Ion-exchange chromatography in analytical chemistry," Moscow, Mir Publishing House, 1973, pp. 86-88.

* cited by examiner

SILICA-BASED SOLS AND THEIR PRODUCTION AND USE

This application claims priority based on U.S. Provisional Patent Application Nos. 60/559,958, filed Apr. 7, 2004 and 60/559,965, filed Apr. 7, 2004.

FIELD OF THE INVENTION

The present invention generally relates to silica-based sols suitable for use in papermaking. More particularly, the invention relates to silica-based sols, their production and use in papermaking. The present invention provides an improved method of producing silica-based sols with high stability and $SiO_2$ contents as well as improved drainage performance.

BACKGROUND OF THE INVENTION

In the papermaking art, an aqueous suspension containing cellulosic fibres and optional fillers and additives, referred to as stock, is fed into a headbox which ejects the stock onto a forming wire. Water is drained from the stock so that a wet web of paper is formed on the wire, and the web is further dewatered and dried in the drying section of the paper machine. Drainage and retention aids are conventionally introduced into the stock in order to facilitate drainage and to increase adsorption of fine particles onto the cellulosic fibres so that they are retained with the fibres on the wire.

Sols of silica-based particles are widely used as drainage and retention aids in combination with charged organic polymers. Such additive systems are among the most efficient now in use in the papermaking industry. One of the parameters affecting the properties and performance of silica-based sols is the specific surface area; stable, high-performance silica-based sols usually contain particles with a specific surface area of at least 300 $m^2/g$. Another parameter is the S value, which indicates the degree of aggregate or microgel formation; a lower S-value is indicative of a higher degree of aggregation. While high surface areas and a certain degree of aggregate or microgel formation may be advantageous from a performance point of view, very high surface areas arid extensive particle aggregation or microgel formation result in considerably decreased stability of silica-based sols, thereby making extreme dilution of the sols necessary so as to avoid gel formation.

U.S. Pat. No. 5,368,833 discloses a silica sol comprising silica particles having a specific surface area within the range of from 750 to 1,000 $m^2/g$ which are surface-modified with aluminum to a degree of from 2 to 25% substitution of silicon atoms, and wherein the sol has an S value within the range of from 8 to 45%. Said patent also discloses a process for producing the silica sol which comprises the steps of acidifying a water glass solution to a pH within the range of from 1 to 4; alkalizing the acid sol at an $SiO_2$ content within the range of from 7 to 4.5% by weight; allowing particle growth of the sol to a specific surface area within the range of from 750 to 1,000 $m^2/g$; and subjecting the sol to aluminum modification.

U.S. Pat. No. 5,603,805 discloses silica sols having an S value within the range of from 15 to 40% comprising anionic silica particles, said silica particles optionally being aluminum modified, and having a specific surface area within the range of from 300 to 700 $m^2/g$. Said patent also discloses a process for producing the silica sol comprising the steps of acidifying a water glass solution to a pH within the range of from 1 to 4; alkalizing the acid sol at an $SiO_2$ content within the range of from 7 to 5% by weight; alternatively alkalization of the acid sol to a pH value between 7 and 9; and particle growth of the sol to a specific surface area within the range of from 300 to 700 $m^2/g$; and optionally followed by aluminum modification.

International Patent. Appln. Publ. No. WO 98/56715 discloses a process for preparing an aqueous polysilicate microgel which comprises mixing an aqueous solution of an alkali metal silicate with an aqueous phase of a silica-based material having a pH of 11 or less. The polysilicate microgel is used as a flocculating agent in combination with at least one cationic or amphoteric polymer in the production of pulp and paper and for water purification.

International Patent. Appln. Publ. No. WO 00/66492 discloses a process for the production of an aqueous sol containing silica-based particles which comprises acidifying an aqueous silicate solution to a pH of from 1 to 4 to form an acid sol; alkalising the acid sol in a first alkalisation step; allowing particle growth of the alkalised sol for at least 10 minutes and/or heat-treating the alkalised sol at a temperature of at least 30° C.; alkalising the obtained sol in a second alkalisation step; and optionally modifying the silica-based sol with, for example, aluminium.

U.S. Pat. No. 6,372,806 discloses a process for preparing a stable colloidal silica having an S-value of from 20-50 and wherein said silica has a surface area of greater than 700 $m^2/g$ comprising: (a) charging a reaction vessel with a catonic ion exchange resin having at least 40 percent of its ion exchange capacity in the hydrogen form wherein said reaction vessel has means for separating said colloidal silica from said Ion exchange resin; (b) charging said reaction vessel with an aqueous alkali metal silicate having a mole ratio of $SiO_2$ to alkali metal oxide in the range of from 15:1 to 1:1 and a pH of at least 10.0; (c) stirring the contents of said reaction vessel until the pH of said contents is in the range of from 8.5 to 11.0; (d) adjusting the pH of the contents of said reaction vessel to above 10.0 using an additional amount of said alkali metal silicate, and (e) separating the resulting colloidal silica from said ion exchange resin while removing said colloidal silica from said reaction vessel.

U.S. Pat. No. 5,176,891 discloses a method for the production of water soluble polyaluminosilicate microgels having a surface area of at least about 1,000 $m^2/g$, comprising the steps of (a) acidifying a dilute solution of alkali metal silicate containing about 0.1 to 6 wt. % $SiO_2$ to a pH of between 2 and 10.5 to produce polysilicic acid; followed by (b) reacting a water soluble aluminate with the polysilicic acid before the polysilicic acid has gelled such that a product with an alumina/silica mole ratio greater than about 1/100 is obtained; and then (c) diluting the reaction mix before gelation has occurred to the equivalence of about 2.0 wt. % $SiO_2$ or less to stabilize the microgels.

It would be advantageous to be able to provide silica-based sols with high stability and $SiO_2$ contents as well as improved drainage performance. It would also be advantageous to be able to provide improved processes for the preparation of silica-based sols with stability and $SiO_2$ contents as well as improved drainage performance. It would also be advantageous to be able to provide a papermaking process with improved drainage.

SUMMARY OF THE INVENTION

The present invention is generally directed to a process for producing a silica-based sol which comprises:
 (a) providing a cationic ion exchange resin having at least part of its ion exchange capacity in hydrogen form;
 (b) bringing said ion exchange resin in contact with an aqueous alkali metal silicate to form an aqueous slurry;

(c) stirring said aqueous slurry until the pH of the aqueous phase is in the range of from 5.0 to 11.5; and/or, alternatively, stirring said aqueous slurry to allow particle aggregation or microgel formation corresponding to an S value up to 45%, and pH of the aqueous phase of at least 5.0;

(d) adjusting the pH of said aqueous phase to above 9.0 using one or more materials comprising at least one aluminium compound; and (e) separating said ion exchange resin from the aqueous phase after step (c) or after step (d), and optionally (f) obtaining an aqueous silica-based sol having an S value between 10 and 50%.

The invention is further generally directed to a process for producing a silica-based sol which comprises:

(a) providing a reaction vessel;

(b) providing in said reaction vessel:
  (i) a cationic ion exchange resin having at least part of its ion exchange capacity in hydrogen form, and
  (ii) an aqueous alkali metal silicate, to form an aqueous slurry;

(c) stirring said aqueous slurry until the pH of the aqueous phase is in the range of from 5.0 to 11.5; and/or, alternatively, stirring said aqueous slurry to allow particle aggregation or microgel formation corresponding to an S value up to 45%, and pH of the aqueous phase of at least 5.0;

(d) adding one or more materials comprising at least one aluminium compound to the aqueous phase obtained after step (c) to form an aqueous phase having a pH of above 9.0;

(e) separating said ion exchange resin from the aqueous phase after step (c) or after step (d); and, optionally, (f) obtaining an aqueous silica-based sol having an S value between 10 and 50%.

The invention is further directed to a silica-based sol obtainable by the processes. The invention is further generally directed to a silica-based sol and, in particular, a silica-based sol having an S value in the range of from 15 to 25%, mole ratio Si:Al in the range of from 20:1 to 50:1, mole ratio Si:X, where X=alkali metal, in the range of from 5:1 to 17:1, $SiO_2$ content of at least 5% by weight and containing silica-based particles having a specific surface area of at least 300 $m^2/g$.

The invention is further directed to uses of the silica-based sol according to the invention, in particular as a drainage and retention aid in papermaking and for water purification.

The invention is further generally directed to a process for producing paper which comprises (a) providing an aqueous suspension comprising cellulosic fibres;

(b) adding to the suspension one or more drainage and retention aids comprising a silica-based sol according to the invention as defined herein; and (c) dewatering the obtained suspension to provide a sheet or web of paper.

DETAILED DESCRIPTION OF THE INVENTION

In accordance with the present invention there is provided silica-based sols which are suitable for use as flocculating agents in water purification and as drainage and retention aids in papermaking. The silica-based sols of the invention exhibit good stability over extended periods of time, notably high surface area stability and high stability to avoid complete gel formation. The silica-based sols further result in very good drainage and retention when used in papermaking, in particular improved drainage. Hereby the present invention makes it possible to increase the speed of the paper machine and to use a lower dosage of additive to give a corresponding drainage effect, thereby leading to an improved papermaking process and economic benefits. The silica-based sols of the invention can be prepared by a process that is simple, quick and easy to control and regulate, and the process makes it possible to utilize simple and less expensive production equipment. Hereby the silica-sols of the invention can be produced by a process that is simplified, improved and more economic.

The ion exchange resin used in the process is cationic and has at least part of its ion exchange capacity in the hydrogen form, i.e. an acid cationic ion exchange resin, preferably a weak acid cationic ion exchange. resin. Suitably, the ion exchange resin has at least 40% of its ion exchange capacity in the hydrogen form, preferably at least 50%. Suitable ion exchange resins are provided on the market by several manufacturers, for example Amberlite® IRC84SP from Rohm & Haas. Preferably, a reaction vessel equipped with means for mixing, e.g. a stirrer, is charged with the ion exchange resin. Preferably, the ion exchange resin is regenerated by addition of an acid, e.g. sulphuric acid, preferably according to manufacturer's instruction.

Step (b) of the process comprises bringing together the cationic ion exchange resin with an aqueous alkali metal silicate. Suitably, this is achieved by adding the ion exchange resin and aqueous alkali metal silicate to the reaction vessel. Preferably, the reaction vessel containing regenerated ion exchange resin is charged with the aqueous alkali metal silicate whereby an aqueous slurry is formed. Usually, the aqueous alkali metal silicate is added to a reaction vessel containing ion exchange resin having at least part of its ion exchange capacity in hydrogen form at a rate in the range of from 0.5 to 50 g $SiO_2$ per minute and kg ion exchange resin, calculated as ion exchange resin having 100% of its ion exchange capacity in hydrogen form, suitably from 1 to 35, and preferably from 2 to 20. Alternatively, a reaction vessel containing the aqueous alkali metal silicate is charged with the regenerated ion exchange resin whereby an aqueous slurry is formed.

Examples of suitable aqueous alkali metal silicates or water glass include conventional materials, e.g. lithium, sodium and potassium silicates, preferably sodium silicate. The molar ratio of silica to alkali metal oxide, e.g. $SiO_2$ to $Na_2O$, $K_2O$ or $Li_2O$, or a mixture thereof, in the silicate solution can be in the range of from 15:1 to 1:1, suitably in the range of from 4.5:1 to 1.5:1, preferably from 3.9:1 to 2.5:1. The aqueous alkali metal silicate used can have an $SiO_2$ content of from about 2 to about 35% by weight, suitably from about 5 to about 30% by weight, and preferably from about 15 to about 25% by weight. The pH of the aqueous alkali metal silicate is usually above 11, typically above 12.

Step (c) of the process comprises stirring the aqueous slurry formed in step (b) until the pH of the aqueous phase is in the range of from 5.0 to 11.5. Alternatively, or additionally, step (c) of the process comprises stirring said aqueous slurry to allow particle aggregation or microgel formation, corresponding to an S value up to 45%, and pH of the aqueous phase of at least 5.0. Suitably stirring is carried out until the pH of the aqueous phase is in the range of from 6.0 to 11.0, preferably to a pH in the range of from 6.5 to 10.0. In one preferred embodiment of the invention, the slurry is stirred until the pH of the aqueous phase is up to 8.0, suitably in the range of from 6.0 to 8.0, preferably from 6.5 to 7.5. In another preferred embodiment of the invention, the slurry is stirred until the pH of the aqueous phase is at least 8.0, suitably in the range of from 8.0 to 11.0, preferably from 9.0 to 10.0. Preferably, particle growth takes place while stirring the aqueous slurry. The silica-based particles formed usually have a specific surface area of at least 300 m²/g, preferably at least 700 m²/g. The specific surface area is suitably up to 1,500 m²/g, preferably up to 1,000 m²/g. Preferably, the slurry is stirred so as to achieve particle aggregation and microgel formation, usually corresponding to an S value in the range of from 5 to 45%, suitably from 8 to 35%, preferably from 10 to 25% and most preferably from 15 to 23%. The stirring usually takes place during a period of time of from 5 to 240 minutes, preferably from 15 to 120 minutes.

Step (c) of the process can be carried out simultaneously with and/or after step (b). In a preferred embodiment, the aqueous alkali metal silicate is added under stirring to the reaction vessel containing ion exchange resin having at least part of its ion exchange capacity in hydrogen form and then, after completed addition, the stirring continues to achieve the pH and/or particle aggregation or microgel formation as described above. In another preferred embodiment, the aqueous alkali metal silicate is added under stirring to the reaction vessel containing ion exchange resin having at least part of its ion exchange capacity in hydrogen form to achieve the pH and/or particle aggregation or microgel formation as described above.

Step (d) of the process comprises adding to the aqueous phase one or more materials comprising at least one aluminium compound. Suitably, the pH of the aqueous phase is adjusted to above 9.0, preferably above 10.0; suitably in the range of from 9.2 to 11.5, preferably from 9.5 to 11.2, and most preferably from 10.0 to 11.0. Preferably, the pH is adjusted by adding one or more materials comprising at least one aluminium compound, preferably the pH is raised by adding one or more alkaline materials comprising at least one aluminium compound. In a preferred embodiment, there is added an aluminium compound. In another preferred embodiment, there is added an alkaline material and an aluminium compound. Examples of suitable aluminium compounds include alkaline aluminium salts as well as neutral and essentially neutral aluminium salts. Examples of suitable alkaline aluminium salts include aluminates, suitably aqueous aluminates, e.g. sodium and potassium aluminates, preferably sodium aluminate. Examples of neutral and essentially neutral aluminium salts include aluminium nitrate. Examples of suitable alkaline materials include aqueous alkali metal silicates, e.g. any of those defined above; aqueous alkali metal hydroxides, e.g. lithium, sodium and potassium hydroxides, preferably sodium hydroxide; ammonium hydroxide; suitably sodium silicate or hydroxide, preferably sodium silicate. When using two or more materials comprising an alkaline material and aluminium compound, the materials can be added in any order, preferably the alkaline material is added first followed by adding the aluminium compound. In a preferred embodiment, aqueous alkali metal silicate is added first and then aqueous sodium aluminate is added. In another preferred embodiment, aqueous alkali metal hydroxide is added first and then aqueous sodium aluminate is added. The addition of aluminium compound provides an aluminated silica-based sol. Suitably, the addition of aluminium compound results in aluminium modification of the silica-based particles, preferably the particles are surface-modified by aluminium. The amount of aluminium compound used can be varied within wide limits. Usually the amount of aluminium compound added corresponds to a mole ratio of Si:Al of from 10:1 to 100:1, suitably from 20:1 to 50:1, preferably from 25:1 to 35:1, and most preferably from 25:1 to 30:1.

In step (d) of the process, when using an aqueous alkali metal silicate to adjust the pH of the aqueous phase, the weight ratio of alkali metal silicate used is step (b) to alkali metal silicate used in step (d) can vary within wide limits; usually the ratio is in the range 99:1 to 1:9, suitably from 19:1 to 1:2, preferably from 4:1 to 1:1.

In step (e) of the process, the ion exchange resin is separated from the aqueous phase, for example by filtration. This can be done after step (c), for example after step (c) but before step (d), or after step (d). It is also possible to separate the ion exchange resin from the aqueous phase during step (d). For example, the ion exchange resin can be separated after adding the alkaline material but before adding the aluminium compound. It is also possible to add part of one alkaline material, e.g. aqueous alkali metal silicate, then separating the ion exchange resin from the aqueous phase followed by adding the remaining part of the alkaline material. Preferably, the ion exchange resin is separated from the aqueous phase after step (d).

The concentration of the aqueous starting materials used in the process, e.g. the aqueous alkali metal silicate, aqueous alkali metal hydroxide and aqueous sodium aluminate, is preferably adjusted so as to provide a silica-based sol which usually has a $SiO_2$ content of at least 3% by weight, suitably at least 5%, preferably at least 6%, most preferably at least 7.5%, and suitably up to 20% by weight, preferably up to 15% by weight. The silica-based sol produced by the process of this invention can have the properties defined hereinafter.

The aqueous silica-based sol according to the invention contains silica-based particles, i.e. Particles based on silica or $SiO_2$, that are preferably anionic and colloidal, i.e., in the colloidal range of particle size. The particles are suitably modified with aluminium, preferably surface modified with aluminium. The silica-based sol of the invention can have a mole ratio of Si:Al of from 10:1 to 100:1, suitably from 20:1 to 50:1, preferably from 25:1 to 35:1, and most preferably from 25:1 to 30:1.

The silica-based sol of the invention can have an S value in the range of from 10 to 50%, suitably from to 12 to 40%, preferably from 15 to 25%, and most preferably from 17 to 24%. The S-value is measured and calculated as described by Iler & Dalton in J. Phys. Chem. 60(1956), 955-957. The S-value indicates the degree of aggregate or microgel formation and a lower S-value is indicative of a higher degree of aggregation.

The silica-based particles present in the Sol can have a specific surface area of at least 300 m²/g, suitably at least 700 m²/g, preferably at least 750 m²/g. The specific surface area is usually up to 1,000 m²/g, suitably up to 950 m²/g. The specific surface area is measured by means of titration with NaOH as described by Sears in Analytical Chemistry 28(1956):12, 1981-1983, after appropriate removal of or adjustment for any compounds present in the sample that may disturb the titration like aluminium and boron compounds, for example as described by Sears and in U.S. Pat. No. 5,176,891.

The silica-based sol of the invention usually has a mole ratio of Si:X, where X=alkali metal, of at least 3:1, suitably at least 4:1, preferably at least 5:1 and most preferably at least 6:1. The mole ratio of Si:X, where X =alkali metal, is usually up to 25:1, suitably up to 20:1, preferably up to 17:1, more preferably up to 15:1 and most preferably up to 10:1.

The silica-based sol of this invention is preferably stable. Suitably, the sol maintains a specific surface area of at least 300 m²/g, preferably at least 700 m²/g, for at least 3 months on storage or ageing at 20° C. in dark and non-agitated conditions. Suitably, the sol maintains an S value in the range of from 10 to 50%, preferably from 12 to 40%, for at least 3 months on storage or ageing at 20° C. in dark and non-agitated conditions.

The silica-based sol according to this invention is suitable for use as a flocculating agent, for example in the production of pulp and paper, notably as a drainage and retention aid, and within the field of water purification, both for purification of different kinds of waste water and for purification specifically of white water from the pulp and paper industry. The silica-based sols can be used as a flocculating agent, notably as a drainage and retention aid, in combination with organic polymers which can be selected from anionic, amphoteric, non-ionic and cationic polymers and mixtures thereof. The use of such polymers as flocculating agents and as drainage and retention aids is well known in the art. The polymers can be derived from natural or synthetic sources, and they can be linear, branched or cross-linked. Examples of generally suitable main polymers include anionic, amphoteric and cationic starches; anionic, amphoteric and cationic acrylamide-based polymers, including essentially linear, branched and cross-linked anionic and cationic acrylamide-based polymers; as well as cationic poly(diallyldimethyl ammonium chloride); cationic polyethylene imines; cationic polyamines; cationic polyamideamines and vinylamide-based polymers, melamine-formaldehyde and urea-fornaldehyde resins. Suitably, the silica-based sols are used in combination with at least one cationic or amphoteric polymer, preferably cationic polymer. Cationic starch and cationic polyacrylamide are particularly preferred polymers and they can be used singly, together with each other or together with other polymers, e.g. other cationic and/or anionic polymers. The molecular weight of the polymer is suitably above 1,000,000 and preferably above 2,000,000. The upper limit is not critical; it can be about 50,000,000, usually 30,000,000 and suitably about 25,000,000. However, the molecular weight of polymers derived from natural sources may be higher.

The present silica-based sol can also be used in combination with cationic coagulant(s), either with or without the co-use of the organic polymers) described above. Examples of suitable cationic coagulants include water-soluble organic polymeric coagulants and inorganic coagulants. The carbonic coagulants can be used singly or together, i.e. a polymeric coagulant can be used in combination with an inorganic coagulant.

Examples of suitable water-soluble organic polymeric cationic coagulants include carbonic polyamines, polyamideamines, polyethylene imines, dicyandiamide condensation polymers and polymers of water soluble ethylenically unsaturated monomer or monomer blend which is formed of 50 to 100 mole % cationic monomer and 0 to 50 mole % other monomer. The amount of cationic monomer is usually at least 80 mole %, suitably 100%. Examples of suitable ethylenically unsaturated cationic monomers include dialkylaminoalkyl (meth)-acrylates and -acrylamides, preferably in quaternised form, and diallyl dialkyl ammonium chlorides, e.g. diallyl dimethyl ammonium chloride (DADMAC), preferably homopolymers and copolymers of DADMAC. The organic polymeric cationic coagulants usually have a molecular weight in the range of from 1,000 to 700,000, suitably from 10,000 to 500,000. Examples of suitable inorganic coagulants include aluminium compounds, e.g. alum and polyaluminium compounds, e.g. polyaluminium chlorides, polyaluminium sulphates, polyaluminium silicate sulphates and mixtures thereof.

The components of the drainage and retention aids according to the invention can be added to the stock in conventional manner and in any order. When using drainage and retention aids comprising a silica-based sol and organic polymer, it is preferred to add the organic polymer to the stock before adding the silica-based sol, even if the opposite order of addition may be used. It is further preferred to add the organic polymer before a shear stage, which can be selected from pumping, mixing, cleaning, etc., and to add the silica-based sol after that shear stage. When using a carbonic coagulant, it is preferably added to the cellulosic suspension before the addition of the silica-based sol, preferably also before the addition of the organic polymer(s).

The components of the drainage and retention aids according to the invention are added to the stock to be dewatered in amounts which can vary within wide limits depending on, inter alia, type and number of components, type of furnish, filler content, type of filler, point of addition, etc. Generally the components are added in amounts that give better drainage and retention than is obtained when not adding the components. The silica-based sol is usually added in an amount of at least 0.001% by weight, often at least 0.005% by weight, calculated as $SiO_2$ and based on dry furnish, i.e. dry cellulosic fibres and optional fillers, and the upper limit is usually 1.0% and suitably 0.5% by weight. The organic polymer is usually added in an amount of at least 0.001%, often at least 0.005% by weight, based on dry furnish, and the upper limit is usually 3% and suitably 1.5% by weight. When using a cationic polymeric coagulant, it can be added in an amount of at least 0.05%, based on dry furnish. Suitably, the amount is in the range of from 0.07 to 0.5%, preferably in the range from 0.1 to 0.35%. When using an aluminium compound as the inorganic coagulant, the total amount added is usually at least 0.05%, calculated as $Al_2O_3$ and based on dry furnish. Suitably the amount is in the range of from 0.1 to 3.0%, preferably in the range from 0.5 to 2.0%.

Further additives which are conventional in papermaking can of course be used in combination with the additives according to the invention, such as, for example, dry strength agents, wet strength agents, optical brightening agents, dyes, sizing agents like rosin-based sizing agents and cellulose-reactive sizing agents, e.g. alkyl and alkenyi ketene dimers and ketene multimers, alkyl and alkenyl succinic anhydrides, etc. The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate.

The process of this invention is used for the production of paper. The term "paper", as used herein, of course include not only paper and the production thereof, but also other cellulosic sheet or web-like products, such as for example board and paperboard, and the production thereof. The process can be used in the production of paper from different types of suspensions of cellulose-containing fibres and the suspensions should suitably contain at least 25% by weight and preferably at least 50% by weight of such fibres, based on dry substance. The suspension can be based on fibres from chemical pulp such as sulphate, sulphite and organosolv pulps, mechanical pulp such as thermomechanical pulp, chemo-thermomechanical pulp, refiner pulp and groundwood pulp, from both hardwood and soft-wood, and can also be based on recycled fibres, optionally from de-inked pulps, and mixtures thereof. The pH of the suspension, the stock, can be within the range of from about 3 to about 10. The pH is suitably above 3.5 and preferably within the range of from 4 to 9.

The invention is further illustrated in the following example which, however, is not intended to limit the same.

Parts and % relate to parts by weight and % by weight, respectively, unless otherwise stated.

EXAMPLES

The following equipment and starting materials were used throughout the Examples:
(a) Reactor equipped with a stirrer;
(b) Ion exchange resin Amberlite® IRC84SP (available from Rohm & Haas) which was regenerated with sulphuric acid according to manufacturer's instruction;
(c) Aqueous sodium silicate solution having a $SiO_2$ content of about 21 wt. % and mole ratio of $SiO_2$ to $Na_2O$ of 3.32;
(d) Aqueous sodium aluminate solution containing 2.44 wt. % $Al_2O_3$; and
(e) Aqueous sodium hydroxide solution having a concentration of 5 moles per kilo.

Example 1

This example illustrates the preparation of a silica-based sol according to the invention: Regenerated ion exchange resin (471 g) and water (1,252 g) were charged into a reactor. The obtained slurry was stirred vividly and heated to a temperature of 30° C. Aqueous sodium silicate (298 g) was then added to the slurry at a rate of 5 g/min. After the addition of sodium silicate, the pH of the slurry was about 7.3. The slurry was then stirred for another 44 minutes, whereupon the pH of the aqueous phase was 6.9. Thereafter additional aqueous sodium silicate (487 g) was added to the slurry at a rate of 5 g/min, whereupon the pH of the aqueous phase was 10.4. The obtained aqueous phase was separated from the ion exchange resin. Aqueous sodium aluminate (52 g) was added to the sol (527.4 g) under vigorous stirring during a period of 10 min.

The obtained silica-based sol had the following properties: $SiO_2$ content=7.7 wt. %; mole ratio Si:Na=7.5; mole ratio Si:Al=26.2; pH=10.7; specific surface area=790 $m^2/g$; and S value=18%.

Example 2

This example illustrates the preparation of another silica-based sol according to the invention: Ion exchange resin (1,165 g), which was regenerated to approximately 40% of its ion exchange capacity, and water (686 g) were charged into a reactor. The obtained aqueous slurry was stirred vividly. Aqueous sodium silicate (989 g) was then added to the slurry during a period of 10 min. After the addition of sodium silicate, the pH of the aqueous slurry was about 10.7. The slurry was then stirred for 22 minutes, whereupon the resulting pH of the aqueous slurry was 9.8. Thereafter additional aqueous sodium silicate (128 g) was added to the slurry during 1 min, whereupon the pH of the aqueous slurry was 10.3. The aqueous phase was separated from the ion exchange resin. Aqueous sodium aluminate (57 g) was added to the aqueous phase (463 g) under vigorous stirring at a rate of 5.7 g/min.

The obtained silica-based sol had the following properties: $SiO_2$ content=10.3 wt. %; mole ratio Si:Na=4.9; mole ratio Si:Al=33.6; pH=11.0; specific surface area=1,000 $m^2/g$; and S value=23%.

Example 3

This example illustrates the preparation of yet another silica-based sol according to the invention: Regenerated ion exchange resin (600 g) and water (1,600 g) were charged into a reactor. The obtained aqueous slurry was stirred vividly and heated to a temperature of 30° C. Aqueous sodium silicate (764 g) was then added to the slurry at a rate of 6.8 g/min. After the addition of sodium silicate, the pH of the aqueous slurry was about 8, whereupon the ion exchange resin was separated from the aqueous phase. Aqueous sodium hydroxide (30 g) was added to the aqueous phase at the rate of 10 g/min, whereupon the pH of the aqueous phase was 10. Aqueous sodium aluminate (83 g) was then added to the aqueous phase (776 g) under vigorous stirring during a period of 10 min.

The obtained silica-based sol had the following properties: $SiO_2$ content=6.1 wt. %; mole ratio Si:Na=5.9; mole ratio Si:Al=20.3; pH=10.9; specific surface area=930 $m^2/g$; and S value=22%.

Example 4

This example illustrates the preparation of another silica-based sol according to the invention: Ion exchange resin (1,785 g), which was regenerated to approximately 40% of its ion exchange capacity, and water (920 g) were charged into a reactor. The obtained aqueous slurry was stirred vividly. Aqueous sodium silicate (1,390 g) was then added to the slurry during a period of 10 min. After the addition of sodium silicate, the pH of the aqueous slurry was about 10.4. The slurry was then stirred for 25 minutes, whereupon the pH of the aqueous slurry was 9.2. The ion exchange resin was separated from the aqueous phase. Aqueous sodium hydroxide (15.5 g) was added to the aqueous phase during a period of about 2 min, whereupon the pH of the aqueous phase was 10. Aqueous sodium aluminate (56.7 g) was then added to the aqueous phase (483 g) at a rate of 5.7 g/min under vigorous stirring.

The obtained silica-based sol has the following properties: $SiO_2$ content=9.8 wt. %; mole ratio Si:Na=6.1; mole ratio Si:Al=30.2; pH=10.8; specific surface area=940 $m^2/g$; and Svalue=22%.

Example 5

The following silica-based sols, Ref. 1 to Ref. 4, were prepared for comparison purposes:

Ref. 1 is a silicabased sol prepared according to the disclosure of Example 4 of U.S. Pat. Nos. 6,372,089 and 6,372,806.

Ref. 2 is a silica-based sol prepared according to the disclosure of U.S. Pat. No. 5,368,833 which had an S-value of about 25%, a mole ratio of Si:Al of about 19 and contained silica particles with a specific surface area of about 900 $m^2/g$ $SiO_2$ which were surface-modified with aluminium.

Ref. 3 is a silica-based sol prepared according to the disclosure of U.S. Pat. No. 5,603,805 with an S-value of 34% and contained silica particles with a specific surface area of about 700 $m^2/g$.

Ref. 4 is a silica-based sol prepared according to the disclosure of U.S. Pat. No. 5,368,833 which had an S-value of 20%, a mole ratio of Si:Al of about 18 and contained silica particles with a specific surface area of about 820 $m^2/g$ $SiO_2$ which were surface-modified with aluminium.

Example 6

In the following tests, drainage performance of the silica-based sols according to Examples 1 and 2 ("Ex. 1" and "Ex. 2", respectively) was tested against the drainage performance of silica-based sols according to Example 5. Drainage performance was evaluated by means of a Dynamic Drainage Analyser (DDA), available from Akribi, Sweden, which measures the time for draining a set volume of stock through a wire when removing a plug and applying a vacuum to that side of the wire opposite to the side on which the stock is present.

The stock used was based on a standard fine paper furnish consisting of 60% bleached birch sulfate and 40% bleached pine sulfate. 30% ground calcium carbonate was added to the stock as filler and 0.3 g/l of $Na_2SO_4.10\ H_2O$ was added to increase conductivity. Stock pH was 8.1, conductivity 1.5 mS/cm and consistency 0.5%. In the tests, the silica-based sols were tested in conjunction with a cationic starch having a degree of substitution of about 0.042. The starch was added in an amount of 8 kg/tonne, calculated as dry starch on dry furnish.

The stock was stirred in a baffled jar at a speed of 1,500 rpm throughout the test and chemical additions to the stock were made as follows:
i) adding cationic starch followed by stirring for 30 seconds,
ii) adding silica-based sol followed by stirring for 15 seconds,
iii) draining the stock while automatically recording the drainage time.

Table 1 shows the results obtained when using varying dosages of silica-based sol, kg/tonne, calculated as $SiO_2$ and based on dry furnish.

TABLE 1

| Test No. | Cationic Starch Dosage [kg/t] | Silica Dosage [kg/t] | Dewatering Time [s] | | | |
|---|---|---|---|---|---|---|
| | | | Ex. 1 | Ex. 2 | Ref. 1 | Ref. 2 |
| 1 | 8 | 0 | 19.4 | 19.4 | 19.4 | 19.4 |
| 2 | 8 | 1.0 | 13.8 | 14.8 | 14.7 | 14.1 |
| 3 | 8 | 1.5 | 12.2 | 13.1 | 13.7 | 13.7 |
| 4 | 8 | 2.0 | 11.1 | 12.0 | 13.1 | 12.6 |

Example 7

Drainage performance of the silica-based sol according to Example 1 was further evaluated. The procedure according to Example 6 was followed except that a cationic polyacrylamide ("PAM") was used instead of cationic starch. In addition, the stock was stirred in a baffled jar at a speed of 1,500 rpm throughout the test and chemical additions to the stock were made as follows:
i) adding cationic polyacrylamide followed by stirring for 20 seconds,
ii) adding silica-based sol followed by stirring for 10 seconds,
iii) draining the stock while automatically recording the drainage time.

Table 2 shows the results obtained when using different dosages of cationic polyacrylamide, kg/tonne, calculated as dry starch on dry furnish, and silica-based sol, kg/tonne, calculated as $SiO_2$ and based on dry furnish.

TABLE 2

| Test No. | Cationic PAM Dosage [kg/t] | Silica Dosage [kg/t] | Dewatering Time [s] | | |
|---|---|---|---|---|---|
| | | | Ex. 1 | Ref. 1 | Ref. 2 |
| 1 | 0.8 | 0 | 17.2 | 17.2 | 17.2 |
| 2 | 0.8 | 0.25 | 9.8 | 11.1 | 10.0 |

TABLE 2-continued

| Test No. | Cationic PAM Dosage [kg/t] | Silica Dosage [kg/t] | Dewatering Time [s] | | |
|---|---|---|---|---|---|
| | | | Ex. 1 | Ref. 1 | Ref. 2 |
| 3 | 0.8 | 0.50 | 7.2 | 8.2 | 7.7 |
| 4 | 0.8 | 0.75 | 6.6 | 7.1 | 7.4 |

Example 8

Drainage performance of the silica-based sols according to Examples 3 and 4 was tested following the procedure according to Example 6. Table 3 shows the results obtained when using varying dosages of silica-based sol, kg/tonne, calculated as $SiO_2$ and based on dry furnish.

TABLE 3

| Test No. | Cationic Starch Dosage [kg/t] | Silica Dosage [kg/t] | Dewatering Time [s] | | | | |
|---|---|---|---|---|---|---|---|
| | | | Ex. 3 | Ex. 4 | Ref. 1 | Ref. 2 | Ref. 3 |
| 1 | 8 | 0 | 20.6 | 20.6 | 20.6 | 20.6 | 20.6 |
| 2 | 8 | 1.0 | 13.9 | 14.8 | 15.5 | 14.7 | 15.1 |
| 3 | 8 | 1.5 | 12.8 | 13.5 | 14.1 | 13.6 | 14.4 |
| 4 | 8 | 2.0 | 12.5 | 12.8 | 13.6 | 13.5 | 13.4 |

Example 8

Drainage performance of the silica-based sol according to Examples 3 and 4 was tested following the procedure according to Example 7. Table 4 shows the results obtained when using varying dosages of silica-based sol, kg/tonne, calculated as $SiO_2$ and based on dry furnish.

TABLE 4

| Test No. | Cationic PAM Dosage [kg/t] | Silica Dosage [kg/t] | Dewatering Time [s] | | | | |
|---|---|---|---|---|---|---|---|
| | | | Ex. 3 | Ex. 4 | Ref. 2 | Ref. 3 | Ref. 4 |
| 1 | 0.8 | 0 | 16.0 | 16.0 | 16.0 | 16.0 | 16.0 |
| 2 | 0.8 | 0.25 | 8.6 | 8.5 | 9.1 | 10.7 | 8.7 |
| 3 | 0.8 | 0.50 | 6.6 | 6.5 | 7.9 | 8.0 | 7.4 |
| 4 | 0.8 | 0.75 | 6.0 | 6.7 | 7.6 | 7.1 | 7.2 |

The invention claimed is:
1. A process for producing an aqueous silica-based sol containing aggregated silica-based particles which comprises:
(a) providing a cationic ion exchange resin having at least part of its ion exchange capacity in hydrogen form;
(b) bringing said ion exchange resin in contact with an aqueous solution of alkali metal silicate having a pH above 12 in a reaction vessel equipped with means for stirring to form an aqueous slurry;
(c) stirring said aqueous slurry in said reaction vessel to allow particle aggregation and until the pH of the aqueous phase is in the range of from 5.0 to 11.5; or stirring said aqueous slurry in said reaction vessel to allow par- ticle aggregation or microgel formation corresponding to an S-value up to 45%, and pH of the aqueous phase of at least 5.0;
(d) adjusting the pH of said aqueous phase to above 9.0 using one or more materials comprising at least one aluminum compound; and
(e) separating said ion exchange resin from the aqueous phase after step (c) or after step (d).

2. The process according to claim 1 wherein in step (d) said one or more materials comprise an alkaline material.

3. The process according to claim 2 wherein the alkaline material comprises an aqueous alkali metal silicate.

4. The process according to claim 2 wherein the alkaline material comprises an aqueous alkali metal hydroxide.

5. The process according to claim 1 wherein in step (c) the aqueous slurry is stirred until the pH of the aqueous phase is in the range of from 6.0 to 8.0.

6. The process according to claim 5 wherein the pH of the aqueous phase is in the range of from 6.5 to 7.5.

7. The process according to claim 1 further comprising (f) obtaining an aqueous silica-based sol having an S-value between 10 and 50%.

8. The process according to claim 1 wherein the ion exchange resin is separated from the aqueous phase after step (c) but before step (d).

9. The process according to claim 1 wherein the ion exchange resin is separated from the aqueous phase after step (d).

10. The process according to claim 1 wherein in step (c) the aqueous slurry is stirred until the pH of the aqueous phase is in the range of from 9.0 to 10.0.

11. The process according to claim 1 wherein in step (d) the aluminum compound is sodium aluminate.

12. The process according to claim 1 wherein in step (d) the pH of the aqueous phase is adjusted to be in the range of from about 9.5 to about 11.2.

13. The process according to claim 1 wherein in step (d) the pH of the aqueous phase is adjusted by first adding aqueous sodium silicate and subsequently adding aqueous sodium aluminate.

14. The process according to claim 1 wherein in step (d) the pH of the aqueous phase is adjusted by first adding an aqueous alkali metal silicate, then the ion exchange resin is separated from the aqueous phase and an aqueous aluminum compound is subsequently added to the obtained aqueous phase.

15. The process according to claim 1 wherein in step (d) the pH of the aqueous phase is adjusted by first adding aqueous sodium hydroxide and subsequently adding aqueous sodium aluminate.

16. The process according to claim 1 wherein in step (c) the slurry is stirred to allow particle aggregation or microgel formation corresponding to an S-value in the range of from 10 to 25%.

17. An aqueous silica-based sol obtained by the process according to claim 1.

18. A process for producing an aqueous silica-based sol containing aggregated silica-based particles which comprises:
(a) providing a reaction vessel equipped with means for stirring;
(b) adding to said reaction vessel:
(i) a cationic ion exchange resin having at least part of its ion exchange capacity in hydrogen form, and
(ii) an aqueous solution of alkali metal silicate having a pH above 12, to form an aqueous slurry;
(c) stirring said aqueous slurry in said reaction vessel to allow particle aggregation and until the pH of the aqueous phase is in the range of from 5.0 to 11.5; or stirring said aqueous slurry in said reaction vessel to allow particle aggregation or microgel formation corresponding to an S-value up to 45%, and pH of the aqueous phase of at least 5.0;
(d) adding one or more materials comprising at least one aluminum compound to the aqueous phase obtained after step (c) to form an aqueous phase having a pH of above 9.0;
(e) separating said ion exchange resin from the aqueous phase after step (c) or after step (d).

19. The process according to claim 18 wherein in step (d) said one or more materials comprise an alkaline material.

20. The process according to claim 19 wherein the alkaline material comprises an aqueous alkali metal silicate.

21. The process according to claim 19 wherein the alkaline material comprises an aqueous alkali metal hydroxide.

22. The process according to claim 18 wherein in step (c) the aqueous slurry is stirred until the pH of the aqueous phase is in the range of from 6.0 to 8.0.

23. The process according to claim 22 wherein the pH of the aqueous phase is in the range of from 6.5 to 7.5.

24. The process according to claim 18 further comprising (f) obtaining an aqueous silica-based sol having an S-value between 10 and 50%.

25. The process according to claim 18 wherein the ion exchange resin is separated from the aqueous phase after step (c) but before step (d).

26. The process according to claim 18 wherein the ion exchange resin is separated from the aqueous phase after step (d).

27. The process according to claim 18 wherein in step (c) the aqueous slurry is stirred until the pH of the aqueous phase is in the range of from 9.0 to 10.0.

28. The process according to claim 18 wherein in step (d) the aluminum compound is sodium aluminate.

29. The process according to claim 18 wherein in step (d) the pH of the aqueous phase is adjusted to be in the range of from about 9.5 to about 11.2.

30. The process according to claim 18 wherein in step (d) the pH of the aqueous phase is adjusted by first adding aqueous sodium silicate and subsequently adding aqueous sodium aluminate.

31. The process according to claim 18 wherein in step (d) the pH of the aqueous phase is adjusted by first adding an aqueous alkali metal silicate, then the ion exchange resin is separated from the aqueous phase and an aqueous aluminum compound is subsequently added to the obtained aqueous phase.

32. The process according to claim 18 wherein in step (d) the pH of the aqueous phase is adjusted by first adding aqueous sodium hydroxide and subsequently adding aqueous sodium aluminate.

33. The process according to claim 18 wherein in step (c) the slurry is stirred to allow particle aggregation or microgel formation corresponding to an S-value in the range of from 10 to 25%.

34. An aqueous silica-based sol obtained by the process according to claim 18.

35. A process for producing an aqueous silica-based sol containing aggregated silica-based particles which comprises:
(a) providing a reaction vessel equipped with means for stirring;
(b) adding to said reaction vessel:
(i) a cationic ion exchange resin having at least part of its ion exchange capacity in hydrogen form, and then (ii) an aqueous solution of alkali metal silicate having a pH above 12, to form an aqueous slurry, wherein said aqueous solution of alkali metal silicate is added to said reaction vessel at a rate in the range of from 0.5 to 50 g $SiO_2$ per minute and kg ion exchange resin, calculated as ion exchange resin having 100% of its ion exchange capacity in hydrogen form;

(c) stirring said aqueous slurry in said reaction vessel to allow particle aggregation and until the pH of the aqueous phase is in the range of from 6.0 to 11.0;

(d) adding an alkaline material and an aluminum compound to the aqueous phase obtained after step (c) to form an aqueous phase having a pH of above 9.0;

(e) separating said ion exchange resin from the aqueous phase after step (c) or after step (d).

36. An aqueous silica-based sol obtained by the process according to claim 35.

* * * * *

UNITED STATES PATENT AND TRADEMARK OFFICE
CERTIFICATE OF CORRECTION

PATENT NO. : 7,629,392 B2
APPLICATION NO. : 11/100683
DATED : December 8, 2009
INVENTOR(S) : Nyander et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Twenty-first Day of December, 2010

David J. Kappos
*Director of the United States Patent and Trademark Office*